United States Patent
Chibwana et al.

(10) Patent No.: US 12,503,746 B2
(45) Date of Patent: Dec. 23, 2025

(54) OXIDATIVE HEAP LEACHING OF BASE METALS

(71) Applicant: BHP CHILE INC., Santiago (CL)

(72) Inventors: Clement Chilowa Chibwana, Concepcion (CL); Tania Valentina Ibanez Valenzuela, Antofagasta (CL)

(73) Assignee: BHP CHILE INC., Santiago (CL)

( * ) Notice: Subject to any disclaimer, the term of this patent is extended or adjusted under 35 U.S.C. 154(b) by 476 days.

(21) Appl. No.: 17/906,526

(22) PCT Filed: Mar. 18, 2021

(86) PCT No.: PCT/IB2021/052257
§ 371 (c)(1),
(2) Date: Sep. 16, 2022

(87) PCT Pub. No.: WO2021/186374
PCT Pub. Date: Sep. 23, 2021

(65) Prior Publication Data
US 2023/0203618 A1 Jun. 29, 2023

(30) Foreign Application Priority Data

Mar. 18, 2020 (ZA) .................................. 2020/01691

(51) Int. Cl.
*C22B 15/00* (2006.01)
*C22B 1/16* (2006.01)
(Continued)

(52) U.S. Cl.
CPC ............ *C22B 15/0071* (2013.01); *C22B 1/16* (2013.01); *C22B 1/24* (2013.01); *C22B 3/065* (2013.01); *C22B 3/08* (2013.01); *C22B 15/0073* (2013.01)

(58) Field of Classification Search
CPC ......... C22B 15/0071; C22B 1/16; C22B 1/24; C22B 3/065; C22B 3/08; C22B 15/0073;
(Continued)

(56) References Cited

U.S. PATENT DOCUMENTS

| 2001/0014297 A1 | 8/2001 | Neufert |
| 2016/0258036 A1* | 9/2016 | Rautenbach ............... C22B 3/08 |
| 2023/0407435 A1* | 12/2023 | Chibwana ........... C22B 15/0071 |

FOREIGN PATENT DOCUMENTS

| WO | WO 01/31072 A1 | 5/2001 |
| WO | WO 2019/123362 A1 | 6/2019 |

OTHER PUBLICATIONS

Hernandez et al., "Accelerating Copper Leaching from Sulfide Ores in Acid-Nitrate-Chloride Media Using Agglomeration and Curing as Pretreatment," Minerals, vol. 9, No. 4, Apr. 25, 2019 (Year: 2019).*

(Continued)

*Primary Examiner* — Danielle M. Carda
(74) *Attorney, Agent, or Firm* — Crowell & Moring LLP (57) ABSTRACT

A method of leaching copper from a heap of ore which includes an ore agglomeration step, an ore stacking step wherein agglomerated ore is stacked to form a heap, a curing step, a leach step, and a rinse step, wherein, during the ore agglomeration step the ore is contacted with an acidified solution, nitrates or nitrites, and chloride, to create an oxidative environment prior to the leach step.

20 Claims, 8 Drawing Sheets

(51) Int. Cl.
  *C22B 1/24* (2006.01)
  *C22B 3/06* (2006.01)
  *C22B 3/08* (2006.01)
(58) Field of Classification Search
  CPC ......... C22B 1/00; C22B 3/44; C22B 15/0089; C22B 3/18
  USPC .......................................................... 75/743
  See application file for complete search history.

(56) References Cited

OTHER PUBLICATIONS

International Search Report and Written Opinion of the International Search Authority mailed Jun. 22, 2021 in International Application No. PCT/IB2021/052257 (English language) (10 pp.).
International Preliminary Report on Patentability dated Jul. 11, 2022 in International Application No. PCT/IB2021/052257 (English language) (43 pages).
Aleksandrov et al., "Absorption of Nitrous Gases Evolving During Nitric Acidic Decomposition of Sulfide Minerals," Russian Journal of Non-Ferrous Metals, Allerton Press, Inc., Heidelberg vol. 52, No. 2, May 12, 2011, pp. 140-145, XP019902147, ISSN: 1934970X, D0I: 10.3103/S1067821211020027 (6 pages).
Hernandez et al., "Accelerating Copper Leaching from Sulfine Ores in Acid-Nitrate-Chloride Media Using Agglomeration and Curing as Pretreatment," Minerals, vol. 9, No. 4, Apr. 25, 2019 (13 pages).
Non-Final Office Action for U.S. Appl. No. 17/906,534 dated Mar. 11, 2025 (19 pp.).

* cited by examiner

LIST OF THE GRAPHS

DARK BROWN        *FIGURE 12*        YELLOW-BROWN

DARK BROWN        *FIGURE 13*        DARK BROWN (LITTLE CHANGE)

FIGURE 14

OXIDATIVE HEAP LEACHING OF BASE METALS

This application is a National Stage application of International Application No. PCT/IB2021/052257, filed Mar. 18, 2021, wherein the above-referenced International Application claims under 35 U.S.C. § 119(a) the benefit of the filing date of Mar. 18, 2020 of South African Application No. 2020/01691, the entire contents of each of which are incorporated herein by reference.

BACKGROUND OF THE INVENTION

This invention relates generally to the leaching of a base metal.

The invention is particularly suitable for the treatment of primary copper ores containing chalcopyrite and secondary sulphide minerals e.g. enargite, bornite, chalcocite and covellite in an oxidative environment.

The oxidative action of nitrate and nitrite salts in aqueous solutions of sulfuric acid is extensively described in the prior art.

Anderson (2003) discloses that the addition or presence of $NO_2-$ instead of $NO_3-$ enhances reaction rates. The nitrate ion acts as a direct oxygen atom donor rather than as an electron acceptor. Results presented by Gok and Anderson (2013) demonstrate that effective leaching of chalcopyrite is achieved by leaching a fine milled mineral (d80 15 microns) with 0.1M $NaNO_2$, 1M $H_2SO_4$, at a temperature of over 100° C. (110-120° C.); i.e. at 80° C. copper recovery was 70% after 6 hours compared to 96% after 2 hours at 120° C. The paper indicates the use of sodium nitrite under these extreme conditions was more effective compared to the use of sodium nitrate.

Sokić et al (2009) describe the kinetics of chalcopyrite leaching from a chalcopyrite concentrate in a sulfuric acid solution using sodium nitrate as an oxidant. The results show the importance of temperature to achieve satisfactory copper dissolution and the requirement of fine milling of the ore (recoveries of >40% required a particle size of minus 37 microns). The dissolution of copper increased with an increase of sulfuric acid and sodium nitrate concentrations, and with a decrease in particle size.

Baldwin and Van Weert (1996) studied the rate of oxidation of ferrous to ferric in the presence of nitrate or nitrites. The rate of Fe(II) oxidation was increased by the addition of nitric acid and nitrate and significantly increased by the addition of nitrite. Thus, the adoption of nitrite-assisted oxidation in autoclaves used for mineral processing could result in more efficient operations.

Ricardo Andres Soto Mellado (Ibáñez & Mellado, 2018) provides a detailed description of the process of copper sulfide mineral oxidation and leaching in acid chloride and sulfuric acid chloride/nitrate solutions. The publication discloses the treatment of a low grade copper sulfide ore in an acid chloride-nitrate medium. The concept of a pre-treatment of an ore by agglomeration and curing is disclosed. The publication describes the mechanisms for chalcopyrite leaching in acid ferric sulfate and sulfuric acid chloride solutions, and the action of adding nitrate (as sodium nitrate or ferric nitrate) to increase the solution oxidation potential. The best metal dissolution achieved was only 27% on a milled sample at 25% solid content on a specific low grade ore (0.12% Cu). It was concluded that the addition of nitrate does not significantly affect the final copper dissolution although increased mineral degradation was achieved.

Hernandez et al (25 Apr. 2019) investigated the effect of an agglomeration and curing pretreatment on leaching of a copper sulfide ore, mainly chalcopyrite, using mini-columns in acid-nitrate-chloride media. Ten pretreatment tests were conducted to evaluate different variables, namely the addition of nitrate as $NaNO_3$ (11.7 and 23.3 kg/ton), chloride as NaCl (2.1 and 19.8 kg/ton), curing time (20 and 30 days) and repose temperature (25° C. and 45° C. The optimum copper extraction of 58.6% was achieved with the addition of 23.3 kg of $NaNO_3$/ton, 19.8 kg of NaCl/ton, and after 30 days of curing at 45° C. Under these pretreatment conditions, three samples of ore were leached in mini-columns. The optimum copper extraction of 63.9% was obtained in the mini-column leaching test at 25° C. with the use of 20 g/L of chloride. In their work, they conclude that a higher temperature (45° C.) and a higher chloride concentration (40 g/L) negatively affected the extraction. The pretreatment stage had favorable effects, in terms of accelerating copper dissolution and improving leaching of copper sulfide ore in acid-nitrate-chloride media.

U.S. Pat. No. 9,683,277 discloses the application of nitrate assisted leaching using ferric nitrate and a method of generating the reagent.

International patent application No. WO 2012/162851 A1 (Fagerstrom; published 6 Dec. 2012), describes a method of generating ferric nitrate in a copper ore hydrometallurgical process. A process flowsheet is presented showing integration of the method of ferric generation with a heap leach process.

Chilean patent No. CL 43295 discloses a method for extracting copper or other metals from sulfide ores which includes the steps of: crushing the ore to minus 6 mm; treating the ore with concentrated sulfuric acid in an agglomeration step; stacking the treated ore in a heap; irrigating the heap with a dilute aqueous solution consisting of sulfuric acid and sodium nitrate ($NaNO_3$) to obtain a leaching product; collecting the leaching product and recovering the copper metal from the leaching product by electrolysis.

International application No. WO 2017/063099 describes a method of leaching with the addition of nitrate in a chloride/sulfuric acid solution achieving high oxidation potentials in solution. The application details the use of a novel reactive mixture in the steps of leaching and chemical curing. This reactive mixture is produced from the combination of nitrate ions from an ammonium nitrate salt ($NH_4NO_3$), iron ions (Fe) derived from a refining solution from a solvent extraction of copper and by the addition of ferrous sulfate, sulfuric acid and chlorine salts. The reactive mixture has a redox potential of between 800 and 1200 mV vs. SHE.

Patents Nos. WO 2012/162851, WO 2017/063099, U.S. Pat. No. 9,683,277 and CL 43295, disclose a method of heap leaching in which ferric nitrate, ammonium nitrate or sodium nitrate act as an oxidising agent, in a sulfuric acid or sulfuric acid/chloride aqueous solution, U.S. Pat. No. 5,096,486 describes a sulfuric acid leach process using sodium nitrite to treat sulfide materials (including copper sulfides) by leaching under relatively mild oxygen pressure and temperature conditions.

U.S. Pat. No. 3,888,748 describes a leaching process using nitric and sulfuric acid at temperatures of at least 50° C.

U.S. Pat. No. 9,816,155 B2 and U.S. patent Ser. No. 10/041,143 B2, disclose methods of pre-treatment of copper sulfide ores in an acid chloride heap leach process, particularly suitable for copper recovery from low grade chalcopyrite ores, at high salt additions, in order to achieve an oxidation potential of greater than 700 mV versus SHE.

U.S. Pat. No. 6,569,391 B1 discloses a method of heap leaching copper ore using sodium nitrate. The method improves copper leaching by using sodium nitrate as an oxidizing chemical reactive in a sulfuric acid leaching solution. The heap leach, or irrigation solution is conditioned prior to application in order to control the nitrate concentration and prevent evolution of $NO_x$ gas evolution in the heap.

During heap leaching, the kinetics of copper leaching are improved as the temperature is increased with the leaching rate doubling for every 8° C. increase in temperature (Mike Nicol, 2013). In heap leaching, the exothermic oxidation of pyrite is responsible for the temperature increase in the heap. Heat generation in most heaps nonetheless is affected by minimal pyrite oxidation mainly because of the existing heap conditions such as chemical composition of the leach solutions. In a chloride leach for instance, temperature increase during leaching is insignificant as pyrite oxidation is negligible due to lower leach solution potential (<750 mV); complete pyrite oxidation is enhanced at a leach solution potential of above 850 mV (Akilan and Nicol, 2017). The presence of impurities such as the sulphate concentration in leach solutions has been reported to have a detrimental effect on the dissolution of pyrite under bioleaching conditions (Nicol et al, 2013).

In view of the foregoing, it is an objective of the invention to provide an oxidative chloride heap leach process for leaching copper at a faster rate from chalcopyrite ores.

A further objective is to enhance the oxidative potential during an ore curing step to self-generate heat by oxidation of sulfide minerals within a heap, and thereby increase the heap temperature and enhance the rate of copper dissolution.

SUMMARY OF INVENTION

The invention is based on the discovery that the chloride heap leaching of primary copper ores, particularly chalcopyrite ores, is enhanced by treating the ore in a highly oxidising environment in an agglomeration step and a curing step at a controlled moisture content.

"Heap" as used herein includes a heap which is treated by irrigation, a column, or a large vat (dome, container) and a large ore dump containing an ore to be processed.

As used herein, "a copper heap leach circuit" refers to at least one heap, and more typically multiple heaps, constructed on a lined pad that facilitates heap drainage to a collective solution system that consists of at least one pond connected through piping to a solvent extraction and electrowinning process to recover copper from the heap drainage (commonly referred to as a "pregnant leach solution" (PLS)). The lower copper and higher acid solution from the solvent extraction process, commonly referred to as "raffinate" is in turn, at least partly, used for heap irrigation.

As used herein, a "dynamic copper heap leach circuit" refers to a copper heap leach circuit, wherein the leached residue material is removed from the circuit after the heap cycle is completed. Such removal is also referred to as "reclaiming". The reclaimed ore is typically disposed of to a residue dump.

A "permanent copper heap leach circuit" refers to a copper heap leach circuit, but uses a single leach pad area for the heap leach process and, on completion of the first and subsequent heap leach cycles, old heaps contain leached residue ore remain in place and new heaps are constructed on top of the old heaps.

All solution potential values described herein are mV versus standard hydrogen electrode (SHE).

The invention provides a method of leaching copper from a heap of ore which includes an ore agglomeration step, an ore stacking step wherein agglomerated ore is stacked to form a heap, a curing step, a leach step, and a rinse step, wherein, during the ore agglomeration step the ore is contacted with an acidified solution, nitrates or nitrites, and chloride, to create an oxidative environment prior to the leach step.

In the method of the invention, heat is generated by oxidation of pyrite in the curing step, thereby increasing the heap temperature.

The present invention is particularly suitable for the treatment of primary copper ores containing chalcopyrite and secondary copper sulfide minerals (for example enargite, bornite, chalcocite and covellite).

Prior to the agglomeration step, the ore may be crushed to a desired particle size. The size is determined taking into account the ore characteristics. The ore crush size may be in the range of P80 of 6 mm to a P80 of 50 mm, preferably P80 of 19 mm.

The method can be performed at a low temperature, for example, at ambient temperature, and at atmospheric pressure using crushed ore.

The crushed ore is treated in an agglomeration step to prepare an agglomerated ore.

In the agglomeration step, chloride salt is added at a fixed rate to the dry ore. The total amount of chloride salt added is in the range of 1-100 kg/t ore, preferably 5-20 kg/t dry ore. The chloride salt may be added as a solid, or in solution with a raffinate solution, as a separate concentrated salt solution or a combination thereof.

To form the acidified solution, sulfuric acid may be added in the range 1-100 kg/t ore, preferably in the range 5-20 kg/t ore. The sulfuric acid may be premixed with a process raffinate solution to form a high acid raffinate solution that is added into the agglomeration step. Alternatively or additionally, concentrated sulfuric acid may be added to the ore during the agglomeration step as required to supplement the acid in the solution.

The acid raffinate solution may contain dissolved Fe, Cu and chloride. The acid raffinate solution may contain chloride at a concentration of 40-160 g/L, preferably 120-150 g/L for primary sulfides.

The acid raffinate solution may be added at a predetermined rate in order to achieve an agglomerate moisture content of 3%-20% moisture, preferably 6%-12%.

Nitrate or nitrite salt may be added in a predetermined amount to meet the process demand in the range 1-50 kg/t ore, preferably 5-20 kg/t ore. The nitrate or nitrite may be added as a solid, in a solution by dissolving in a raffinate solution or water, as a separate concentrated nitric acid solution or a combination thereof. Nitrate or nitrite salt may also be added after the ore agglomeration step during heap construction with the agglomerated ore.

Gases (HCl and $NO_x$) produced in the ore agglomeration step are recovered by passing the gases through process raffinate solution in a gas scrubbing step.

Nitric oxide gas (NO) has a much lower solubility in the aqueous raffinate solution used compared to $NO_2$. NO gas is oxidised to $NO_2$ by mixing air, or oxygen enriched air with the $NO_x$ in the gas scrubbing step. The resulting raffinate solution from the gas scrubbing step is recycled to the ore agglomeration step or to a heap irrigation solution to be used in the leach step.

The agglomerated ore is then transferred to a leach pad to form a heap.

The agglomerated ore is cured in a curing step for a period of 5-50 days, preferably 30-45 days for primary sulfides.

During the curing step, aeration may be applied from the bottom of the heap at a determined rate in the range 0-0.02 $Nm^3/hr \cdot t$, preferably 0-0.01 $Nm^3/hr \cdot t$ of ore treated.

The curing step is followed by the leach step. The heap is irrigated with a raffinate solution to leach copper dissolved during the curing step and to continue copper dissolution during the leach step. If required, the heap may be irrigated with an intermediate leach solution (ILS) or with the resulting raffinate solution from the gas scrubbing step.

The irrigation solution may have a chloride concentration of 10-230 g/L, preferably 40-160 g/L and more preferably 120-150 g/L for primary sulfides. The irrigation solution may have an acid concentration of 2-20 g/L, preferably 5-10 g/L so that the solution pH is less than pH 3.

The leach step may be carried out without aeration. Alternatively, the irrigation step may be carried out with aeration in the range 0-0.02 $Nm^3/hr \cdot t$, preferably 0-0.01 $Nm^3/hr \cdot t$ of ore treated.

The irrigation solution may be supplemented with nitrate salts or nitrite salt to maintain the concentration of nitrate or nitrite in the range 0-20 g/L, preferably 5-10 g/L.

The addition of nitrate or nitrite in the irrigation solution maintains high oxidation potentials in the leach step and enhances the rate of copper dissolution.

Continued pyrite oxidation in the leach step at oxidation potentials of >750 mV<1250 mV generates heat and increases the heap temperature.

The leach step is continued until the leach cycle is complete to achieve the target metal recovery.

Recycled process solution containing chloride and nitrate or nitrite salts is used in the leach step.

A resultant heap drainage solution, or pregnant leach solution (PLS), from the leach step, is treated in a solvent extraction (SX) step to recover the leached copper.

The raffinate solution is the solution produced from treating the PLS in the solvent extraction (SX) step.

The source of chloride may be NaCl, KCl, MgCl, $Al_2CL_3$, $CaCl_2$ or any other available soluble inorganic chloride salt. This is not limiting.

The source of nitrite may be $NaNO_2$, $KNO_2$, $HNO_2$ or any other soluble inorganic nitrite salt or acid. This is not limiting.

The source of nitrate may be $NaNO_3$, $KNO_3$, $HNO_3$ or any other soluble inorganic nitrate salt or acid. This is not limiting.

The solution in contact with the ore during the ore agglomeration step is acidic with a pH of less than 3.

The solution in contact with the ore in the ore agglomeration step contains iron, copper and other dissolved metals as sulfate or chloride salts.

The method of ore agglomeration and curing increases solution oxidation potential in contact with the ore to >750 mV<1250 mV. This in turn increases heap temperatures as a result of the pyrite and copper sulfide mineral oxidation thereby increasing the rate of copper sulfide mineral dissolution and oxidation of pyrite compared to conventional chloride leaching.

Heat is transferred up the heap of agglomerated ore by moist air blown in at the base of the heap and is lost in warm moist air leaving the heap. Heat is transferred down the heap by the irrigation solution and is lost from the heap in the drainage solution. The heap temperature is maintained at a maximum by controlling the rate of aeration and rate of solution irrigation, thereby reducing the rate of heat loss from the heap.

The invention ensures that a high oxidising environment within the heap is created by the oxidative action of nitrate or nitrite and, as such, sulfide minerals are oxidised with or without the supply of air (oxygen) to the process.

The high oxidation potentials created by the method of ore agglomeration and curing increases the rate of copper mineral dissolution and reduces the duration of the heap leach cycle significantly compared with the standard chloride leach method.

The presence of nitrate or nitrite salts in copper PLS solutions has a detrimental effect on the operation of the solvent extraction (SX) plant as it degenerates the extractants used through nitrification. It is necessary to use suitable proprietary SX reagents and extractant modifiers to prevent excessive reagent degradation.

A wash stage of loaded organic (organic loaded with copper following the SX extraction stage) is included in a solvent extraction process in order to maintain the chloride ion concentration below 50 ppm, and more preferably below 30 ppm in an enriched electrolyte in a tank house. The wash step lowers all entrained soluble species but, principally, dissolved chloride and nitrate or nitrite salts. Wash solutions are recycled to the heap irrigation solution.

DESCRIPTION OF THE DRAWINGS

The invention is further described by way of example with reference to the accompanying drawings in which.

DESCRIPTION OF PREFERRED EMBODIMENT

Figure 14:
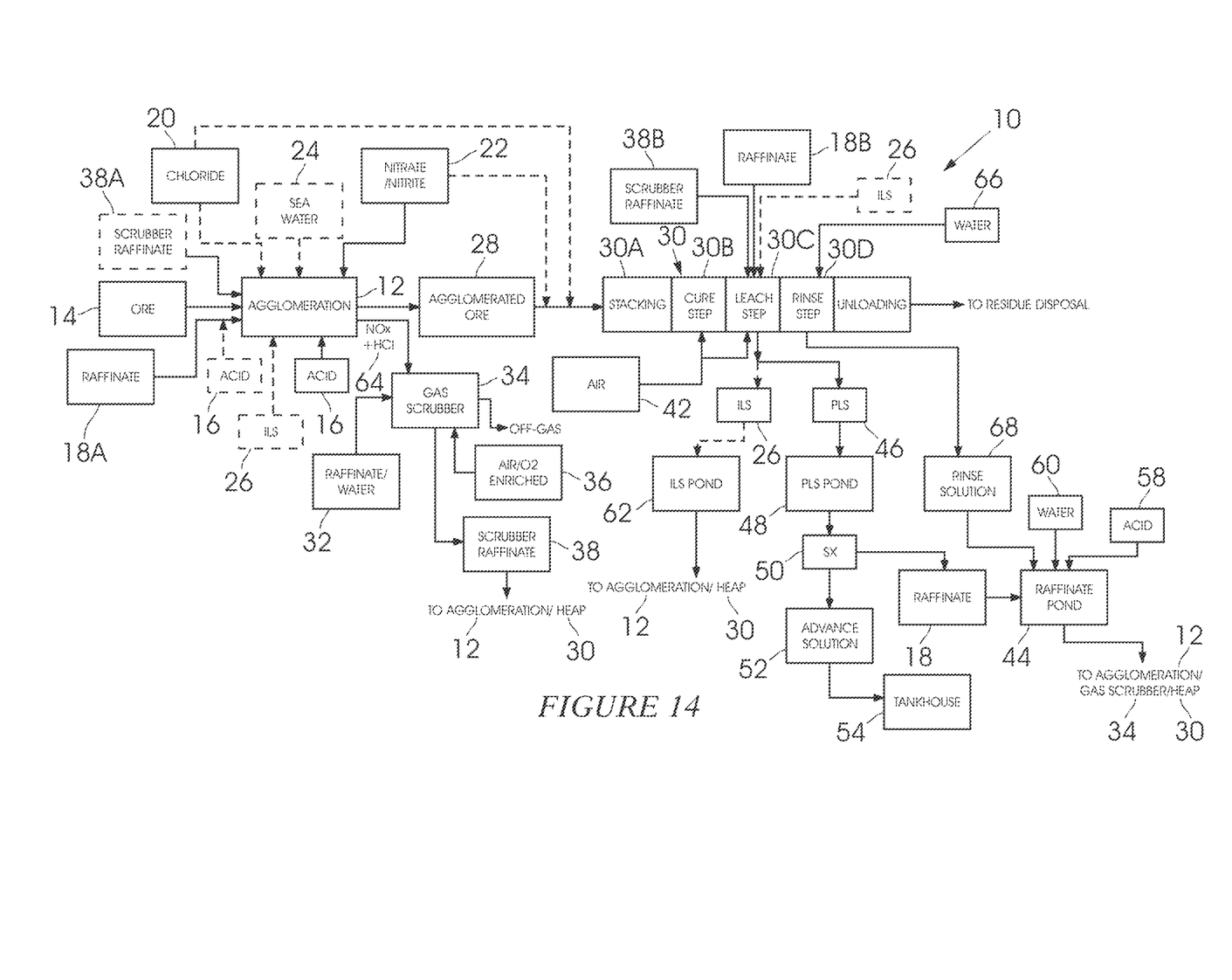
FIG. 14 is a flow diagram of the method of the invention.

FIG. 14 shows a simplified and generalised dynamic copper heap leach circuit 10 according to the invention which can be used for the leaching of primary sulfides, secondary sulfides, oxides and mixed copper ores.

The dynamic copper heap leach is not limiting and the invention applies to any chosen method of leaching agglomerated ore in a heap, which may be a permanent copper heap leach circuit.

In an agglomeration step 12, ore 14 to be treated is added to an agglomeration drum together with sulfuric acid 16, a leach raffinate solution 18A, chloride 20, nitrate or nitrite 22, and, optionally, sea water 24, to produce an agglomerated ore 28.

Sulfuric acid 16 is added as a concentrated acid to the ore during the agglomeration step 12 as required to supplement the acid in the solution. The concentrated acid is added in in the range of 1-100 kg/t, preferably 5-20 kg acid/t ore treated. Optionally, sulfuric acid 16 is premixed with the leach raffinate solution 18A to form a high acid raffinate solution that is then added to the agglomeration drum.

The leach raffinate solution 18A contains a chloride concentration in the range of 10-230 g/L, preferably 120-160 g/L chloride for primary sulfides.

The chloride 20 is added in the agglomeration step 12 in the range of 1-50 kg/t of the ore 14, preferably 5-20 kg chloride salt/t of ore treated.

The chloride 20 is added to the ore 14 either before the agglomeration step 12 as a solid, in solution in the agglomerating drum as contained in a contact solution, as a solid after the agglomeration step 12 or in both forms (solid and liquid) before the agglomerated ore 28 is stacked (30A) on a heap 30.

The nitrate or nitrite 22 is added to the agglomeration step 12 in the range of 1-50 kg/t of the ore 14, preferably 3-20 kg nitrate or nitrite salt/t of ore treated.

The nitrate or nitrite 22 can be added to the ore 14 either before the agglomeration step 12 as a solid, in solution form in the agglomeration step 12, as a solid after the agglomeration step 12 or in both forms (solid and liquid) before the ore 28 is stacked (30A) on the heap 30.

The oxidation reaction of the nitrate or nitrite 22, sulfuric acid 16 and the leach solution 18 with the ore 14 is exothermic and thus increases the temperature of the agglomerated ore 28 once it is stacked in a heap. Oxidation of 14.5 kg/t of pyrite (1.4% pyrite content in the ore) generates 21 watts per ton of ore and will increase heap temperatures above ambient by 10-30° C., depending on heat losses by convection and radiation from the heap surfaces, and heat loss from moist air leaving from the top of the heap and drainage solution leaving from the bottom of the heap.

In a standard operation, the leach solution 18 contains a copper concentration of 0.5 g/L, Fe(T) of 2 g/L with other dissolved species from the circuit. However, these concentrations can be varied based on the plant conditions and on the nature of the ore 14 being treated.

If required, and based on availability, an intermediate leach solution (ILS) 26 containing 1-5 g/L copper can be used instead of the raffinate leach solution 18A during the agglomeration step 12. The slightly higher copper concentration in the intermediate leach solution 26 is beneficial as the copper ions are expected to increase the oxidation capacity in the agglomerated ore 28 during the subsequent curing step 30B in the heap 30.

During the agglomeration step 12, a combination of gasses 64 (HCl and $NO_x$) are produced. These gasses 64 are passed through a process water or raffinate solution 32 in the presence of air or oxygen enriched air 36 in a gas scrubbing step 34. NO gas is oxidised to $NO_2$.

The resulting scrubber raffinate 38 can be recycled 38A to the agglomeration step 12 to be used as a contact solution for agglomeration or can be used as a heap irrigation solution (38B) for leaching. The use of the recycled scrubbing raffinate 38A for agglomeration leads to a decrease in the amount of fresh nitrate to be added to the ore, thus optimising reagent usage. Tests conducted show that the gasses produced, HCl and NO, are highly soluble in the standard contact solution used resulting in an increase in solution potential, >750 mV<1250 mV, due to dissolved oxidants. NO gas evolved is oxidised to $NO_2$ by the action of oxygen in the gas scrubbing step.

The generation of NOx and HCl gases during agglomeration demands that the reactants be added in a manner that should inhibit the spontaneous reaction to occur and generate the gases. It is therefore recommended that optimal amounts of nitrate or nitrite should be added to the ore when it exits the agglomeration drum, just before the ore is stacked.

It is important that adequate Personal Protective Equipment (PPE) is worn by an operator to avoid exposure to the gases.

In the agglomeration step 12, the reactants (16, 18, 20, 22, 24, 26, 38A) are mixed with the ore 14. The moisture content of the final agglomerated ore 28 is in the range of 3%-20% moisture, more preferably 6%-12% moisture. The final moisture content of the agglomerated ore 28 should be such that all the important reactions continue taking place during the curing step 30B. If the moisture content is not sufficient, the ore will dry and the curing step 30B will not be effective.

The agglomerated ore 28 is transferred to a heap 30 for stacking 30A. A system of belts (not shown) can be used to transfer the agglomerated ore 28 to the heap 30.

The stacked ore 30A in the heap 30 is then subjected to a curing step 30B and is allowed to cure for a period of 2-100 days, preferably 30-45 days. During the curing step 30B, forced aeration 42 may be applied from the bottom of the heap 30 at a rate determined based on the mineral being treated, preferably 0-0.01 $Nm^3$/hr·t of ore treated.

Once curing is completed, the leach or raffinate solution 18B from a raffinate pond 44 is applied on top of the heap 30 in a leach step 30C to displace copper leached during the cure step 30B and to continue copper leaching of the agglomerated ore 28 in the heap 30.

The leach solution 18B percolates through the heap 30 and is collected at the bottom of the heap 30 as a pregnant leach solution (PLS) 46 which contains a high copper concentration and other cationic and anionic species from the leaching of the agglomerated ore 28 in the heap 30.

The PLS 46 is collected in a pond 48 which feeds a solvent extraction (SX) plant 50 where copper is concentrated to produce an advance solution 52 that is sent to a tank-house 54 for copper electrowinning. The copper stripped PLS solution is a raffinate solution 18 and is collected in the pond 44. The raffinate 18 is recycled (18B) to the heap 30 or is recycled (18A) to the agglomeration step 12.

In the raffinate pond 44, fresh water 60 may be added as make-up water in order to compensate for volume loss due to moisture retained in residue ore, spillages, leakages and evaporation. Fresh concentrated sulphuric acid 58 is added, as required, in order to replace acid that is consumed in the leach step 30C and to maintain a required acid concentration in the raffinate 18.

As leaching proceeds in the step 30C, the copper concentration decreases in the PLS 46 and the resulting intermediate leach solution (ILS) 26, is routed to the ILS pond 62 where the concentration is normally in the range of 1-5 g/L copper. Besides being used as a contact solution in the agglomeration step 12, the intermediate leach solution 26, from the pond 62, can be pumped to the heap 30 where it can be used as a leach solution in step 30C. The resulting solution from the heap 30 is sent to the PLS pond 48 or to the ILS pond 62, depending on the copper concentration. Typically the copper concentration in the PLS 46 is >5 g/L Cu, however this is not limiting. The ILS pond 62 also provides capacity for additional storage in the event of disruption to downstream treatment of the PLS 46 in the SX step 50.

On completion of the leach step 30C the ore is rinsed in a rinse step 30D using process water 66 to displace and recover acid, chloride, and residual copper and residual nitrates or nitrites present in the heap 30. The rinse solution 68 is directed to the raffinate pond 44.

On completion of solution drainage from the heap 30 after the rinse step 30D, in a dynamic heap leach circuit, the ore is unloaded from the leach pad and sent to a residue dump.

Figure 1:
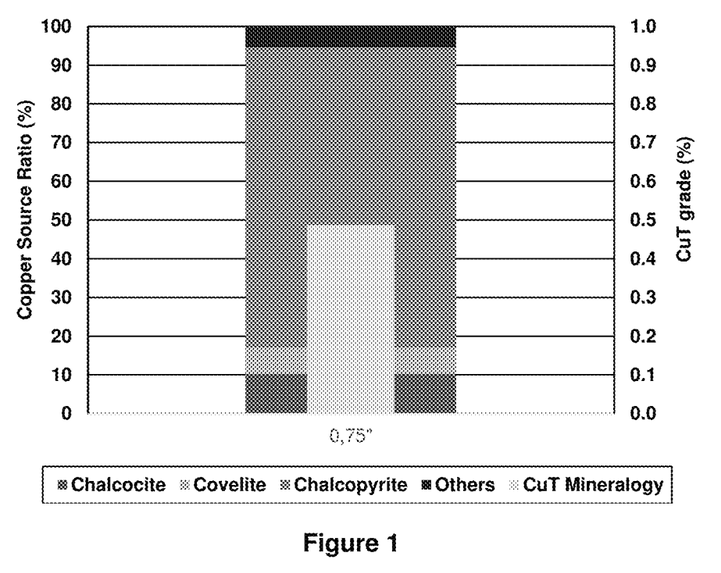
FIG. 1 illustrates the mineralogical composition of a sample used in test columns showing the main copper source.

The performance of the method of the invention (hereinafter referred to as the "NitrosaL process") was tested by the applicant on a primary copper sample containing 80% chalcopyrite as the main copper source with a copper grade of 0.49% as presented in FIG. 1. Two versions of the method were tested referred to respectively as NitrosaL 1 and NitrosaL 2, for distinguishing purposes.

The sample, received as Run of Mine (ROM), was prepared in order to produce a final sample of $P_{80}$~¾" through a series of crushing and blending in order get a representative sample.

The prepared sample was agglomerated with 15 kg/t sodium chloride, and 20 kg/t sodium nitrate or nitrite and 12 kg/t sulfuric acid, producing agglomerates with an average moisture content of 8% for the NitrosaL process. For the standard high chloride process, similar conditions were used except that no sodium nitrate or nitrite was added—see Table 1.

TABLE 1

Conditions of Agglomeration

| | | NitrosaL 1 | NitrosaL 2 | Chloride 1 |
|---|---|---|---|---|
| Particle Size | P80 | 0.75" | 0.75" | 0.75" |
| Acid dosage | kg/t | 12 | 12 | 12 |
| Sodium Chloride dosage* | kg/t | 15 | 15 | 15 |
| Sodium Nitrate or nitrite dosage** | kg/t | 20 | 20 | 0 |
| Temperature | ° C. | | Ambient ~14 | |
| Aeration rate | Nm3/hr · t | 0.01 | 0.01 | 0.01 |
| Irrigation rate | L/m2 · hr | 2 | 2 | 2 |
| Irrigation Time | hrs/day | 12 | 12 | 12 |
| Cure Period | days | 30 | 45 | 45 |
| Column Height | m | 1 | 1 | 1 |
| Column Diameter | cm | 16 | 16 | 16 |

TABLE 2

Agglomeration Raffinate Solution Compositions

| Column | CuT (g/l) | FeT (g/l) | Fe +2 (g/l) | H+ (g/l) | Cl (g/l) | Density | Nitrate or nitrite (kg/t) | SO4 (g/l) |
|---|---|---|---|---|---|---|---|---|
| NitrosaL | 0.56 | 1.21 | 0.52 | 8.2 | 151* | 1.26 | 20** | 90 |
| Chloride | 0.56 | 1.21 | 0.52 | 8.2 | 151* | 1.26 | 0 | 90 |

*Chloride required: 15 kg/t NaCl-mostly added in raffinate at 150 g/l Cl and if the desired value is not achieved (based on the agglomerate moisture), solid NaCl was added to the ore directly during agglomeration to make-up.
**Nitrate or nitrite required: 20 kg/t NaNO₃-added as solid to the drum during agglomeration or dissolved in known volume of raffinate solution that was used for ore agglomeration.

Chloride required: 15 kg/t NaCl—mostly added in raffinate at 150 g/Cl and if the desired value is not achieved (based on the agglomerate moisture), solid NaCl was added to the ore directly during agglomeration to make-up.

Nitrate or nitrite required: 20 kg/t $NaNO_3$— added as solid to the drum during agglomeration or dissolved in known volume of raffinate solution that was used for ore agglomeration.

TABLE 3

Irrigation Raffinate Composition*

| Raffinate | CuT (g/l) | FeT (g/l) | Fe +2 (g/l) | H+ (g/l) | Cl (g/l) | Density |
|---|---|---|---|---|---|---|
| Chloride | 0.56 | 1.21 | 0.52 | 8.2 | 151* | 1.26 |

*Same raffinate was used for both processes

Same raffinate was used for both processes

The agglomerated ores were loaded into their respective 1 m×160 mm ID columns and allowed to cure for 30 and 45 days respectively for the NitrosaL process. For the high saline chloride process (referred to as Chloride 1), the samples were cured for 45 days. Aeration of 0.01 Nm³/hr·t was used during curing and irrigation for both processes.

Upon the completion of the curing step, a contact solution with a solution composition as presented in Table 2 above was used as irrigation solution for ore loaded in the columns which were irrigated. The PLS was analysed for $Cu^{2+}$ Fe(T), $Fe^{2+}$ and acid respectively.

Figure 2:
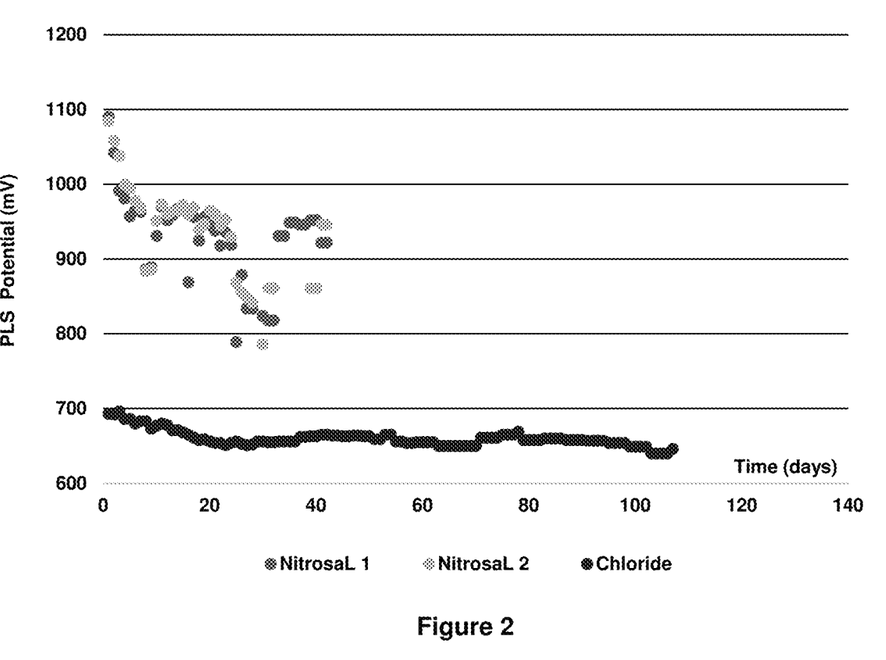
FIG. 2 is a comparison plot of solution potentials of a pregnant leach solution for the present invention and chloride leach processes.

The results show a much higher solution potential of up to 1100 mV for the NitrosaL columns at solution break through compared to 700 mV from the columns using the standard chloride process (see FIG. 2). The solution potential then decreased for both processes with the NitrosaL columns dropping to below 900 mV but increased again to stabilise just above 950 mV while the chloride column stabilised around 650 mV. All potential measurements are against the standard hydrogen electrode (SHE).

Figure 4:
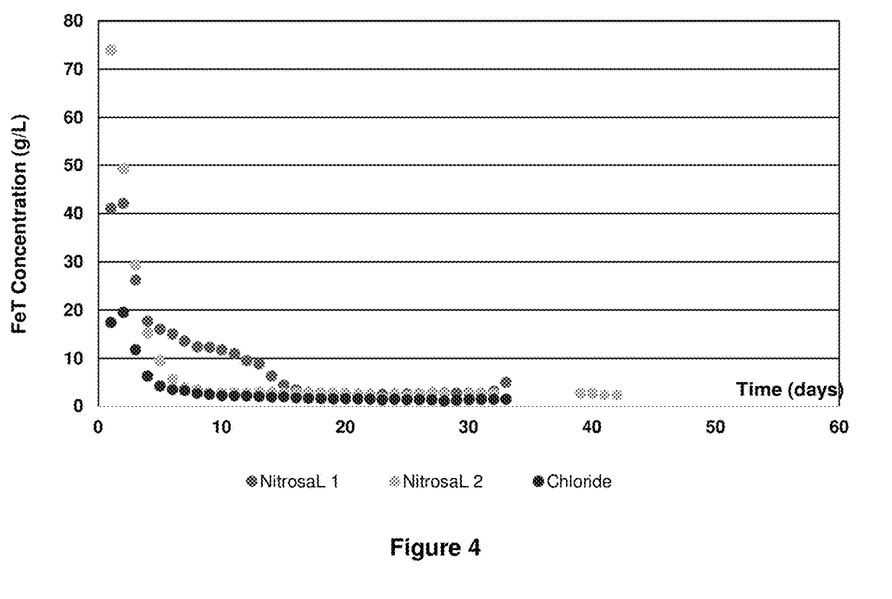
FIG. 4 is a comparison plot solution of iron concentration in a pregnant leach solution for the present invention and chloride leach processes.

The PLS obtained contained a much higher Fe(T) concentration compared to what was measured in the chloride process column (see FIG. 4). Above 80 g/L Fe(T) was obtained for NitrosaL 1 and 40 g/L Fe(T) for NitrosaL 2. The Fe(T) existed mainly as ferric which was more than double the Fe(T) in the standard chloride process column.

Figure 5:
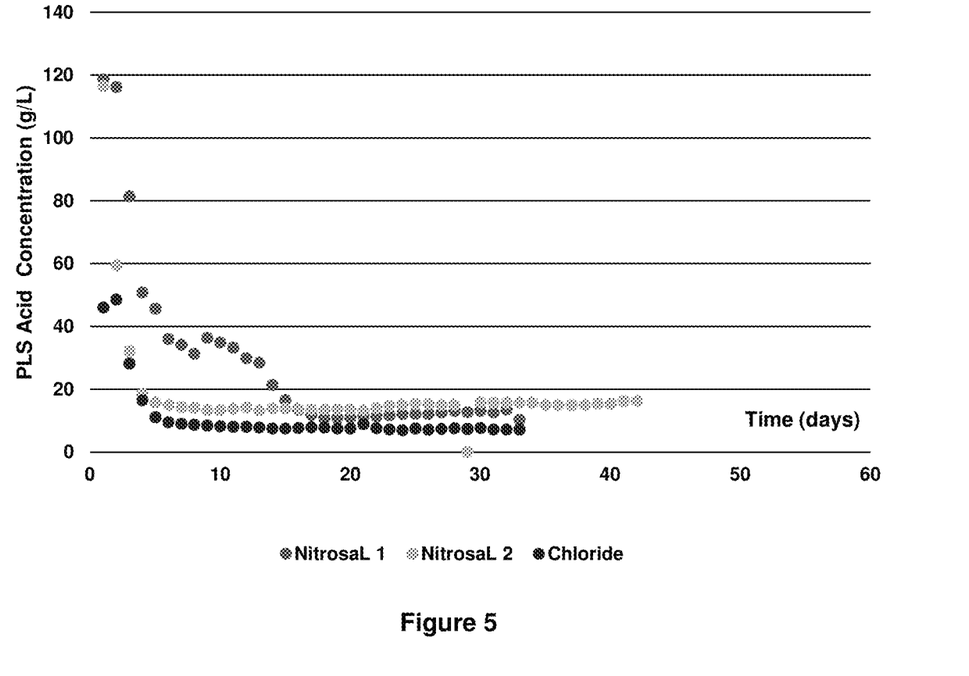
FIG. 5 is a comparison plot solution of acid concentration in the pregnant leach solution for the present invention and chloride leach processes.

Similarly, the NitrosaL columns produced three times more acid compared to the chloride process before the concentration decreased and stabilised to comparable values by day 30 (see FIG. 5). The higher acid generation is confirmation of the pyrite oxidation that was taking place in the columns due to the high oxidising environment. In a standard chloride process, pyrite oxidation is limited due to the lower solution potentials of below 750 mV.

Figure 3:
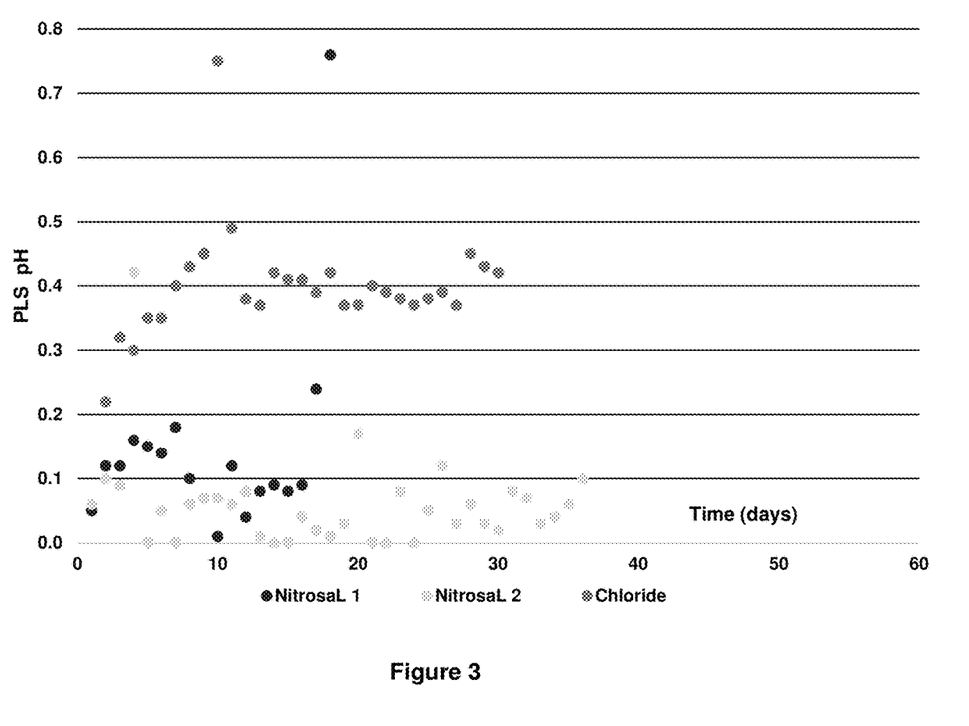
FIG. 3 is a comparison plot solution of pH profiles in a pregnant leach solution for the present invention and chloride leach processes.
Figure 6:
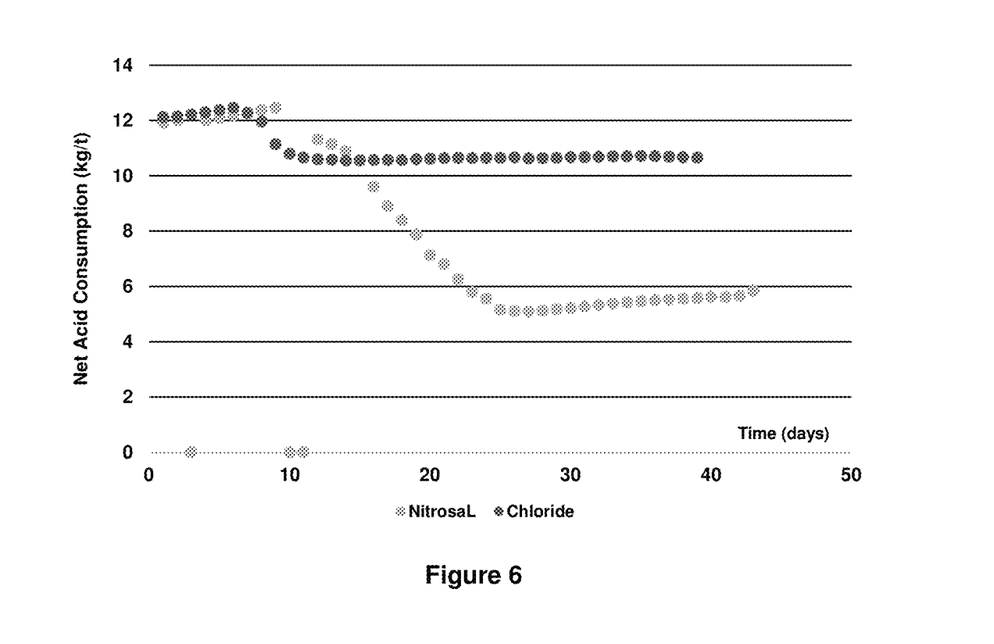
FIG. 6 is a comparison plot of net acid consumption between the method of the present invention and chloride processes for the same period of operation.

Due to the high acid generation in the first few days of operation, the net acid consumption (NAC) was about 45% lower in the NitrosaL columns compared to the chloride process for the same period of operation (see FIG. 6). The high acid generation is shown by the low pH values of the solution drainage from the NitrosaL columns (shown in FIG. 3 as NitrosaL 1 and NitrosaL 2).

Figure 9:
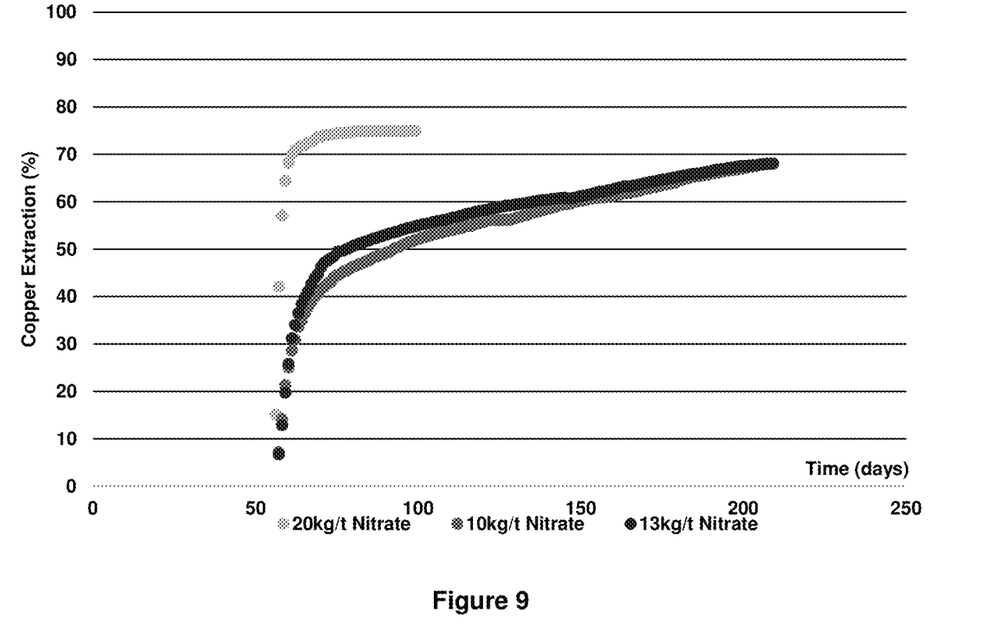
FIG. 9 is a comparison plot solution of copper extractions showing the effect of different nitrate or nitrite additions in the present invention.
Figure 10:
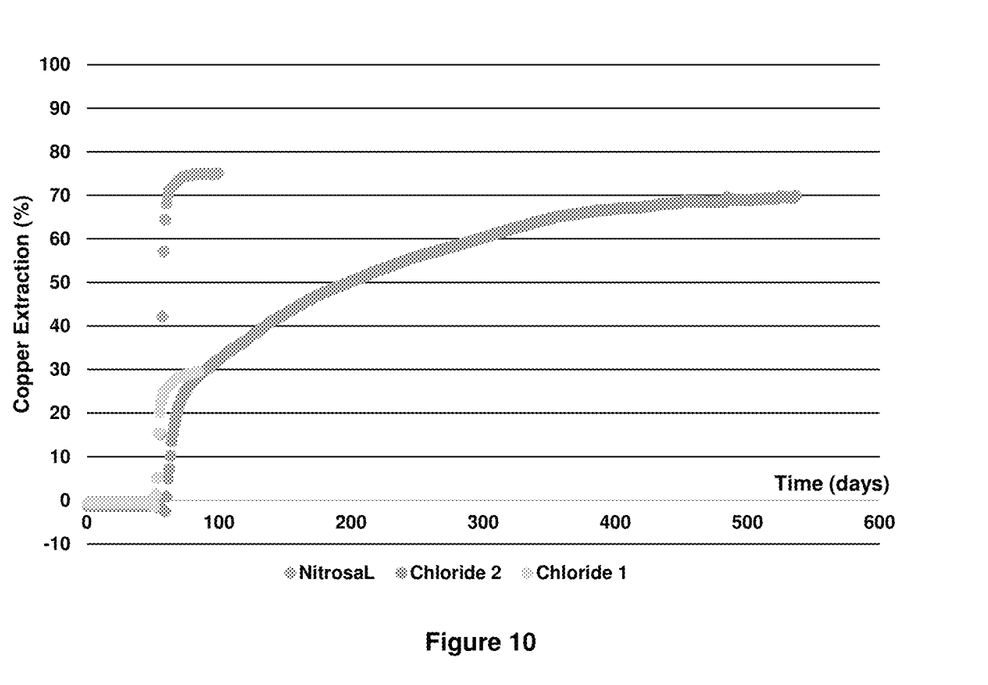
FIG. 10 is a comparison plot of copper extractions for the present invention and chloride process columns.

A maximum of 74% copper dissolution was achieved in less than 75 days in the NitrosaL columns compared to 30% copper dissolution in the chloride process for the same period of operation (see FIG. 10). The copper dissolution results also show that increasing the nitrate or nitrite content during the agglomeration step improves the copper dissolution rate as this makes the leach environment more aggressive (see FIG. 9). Mineralogy results of the ore show that the sample contained 3% pyrite and after leaching almost 50% of the pyrite was oxidized during the period of operation. Pyrite oxidation is critical to heat generation in heaps. Such heat generation increases the leach rate. The results show that 75% chalcopyrite dissolution was achieved during the same period of operation (See FIG. 10).

In order to achieve 70% copper extraction for the same sample, it took more than 540 days of operation in the chloride process compared to 75 days for the NitrosaL process (see FIG. 9). The sample treated under chloride conditions also had to be crushed finer ($P_{80}$ ½") and operated at a fixed temperature of 20° C. The sample loaded in columns under NitrosaL conditions was crushed to $P_{80}$½" and operated at ambient temperature (~14° C.).

Figure 7:
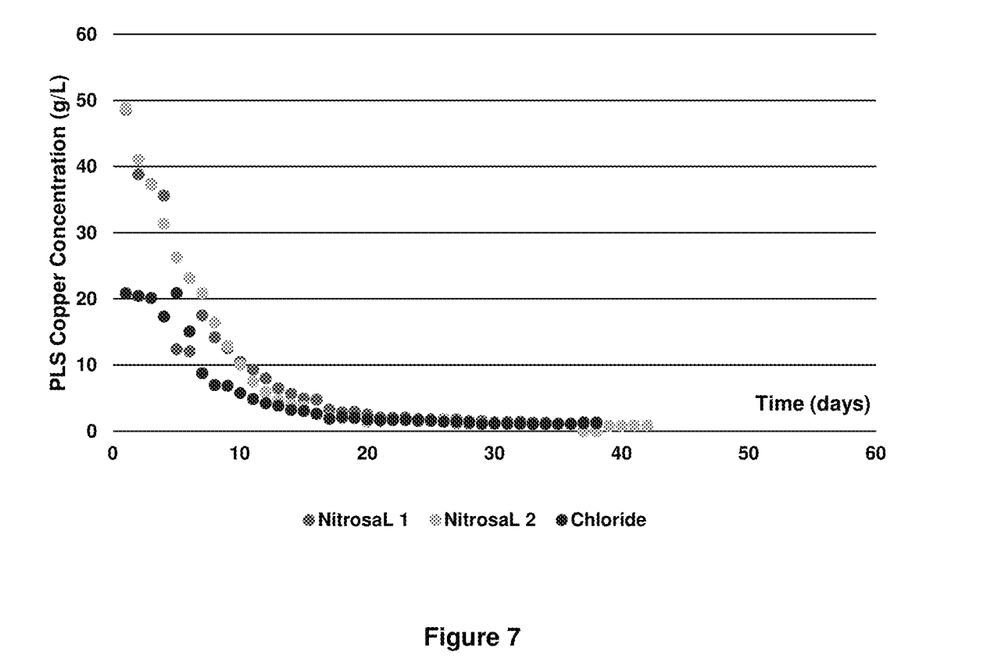
FIG. 7 is a comparison plot of copper concentration in the pregnant leach solution for the present invention and chloride leach processes.
Figure 8:
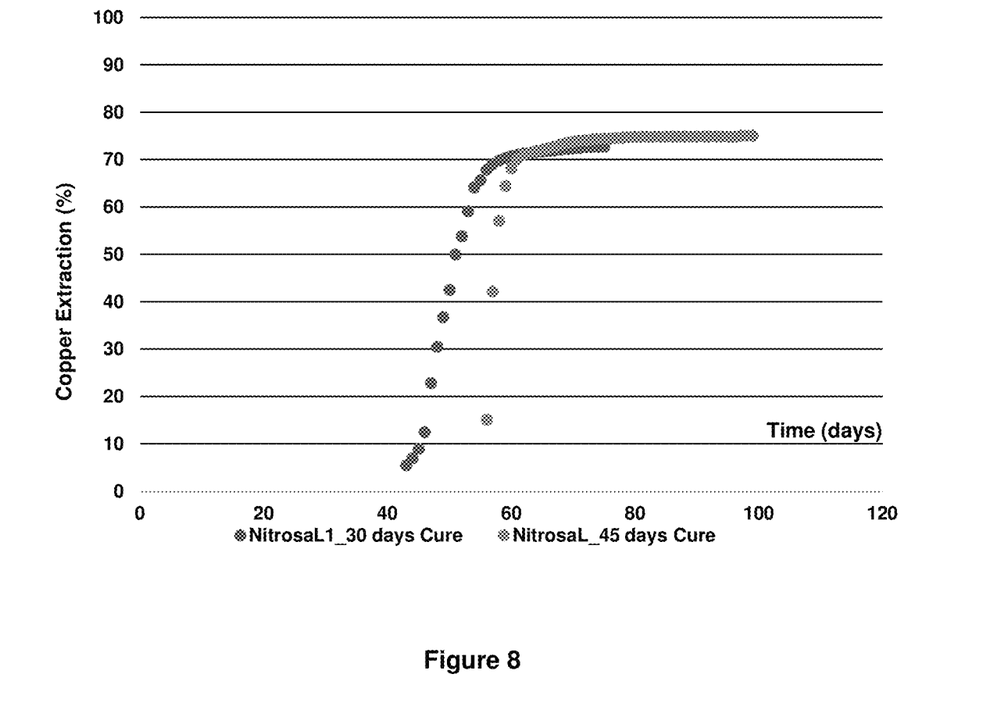
FIG. 8 is a comparison plot of copper extractions showing the effect of different curing times for columns of the present invention.

There was no observed difference in copper dissolution when the results of the sample that was cured for 45 days were compared with those for sample cured for 30 days under NitrosaL conditions (see FIG. 8). This therefore provides an opportunity for a shorter leach cycle time. The rapid dissolution of copper from the ore in the NitrosaL columns is shown in FIG. 7.

The results obtained demonstrate that the NitrosaL process creates a higher oxidising environment in the heap which facilitates the dissolution of metals of interest at a faster rate and also reduces the cycle time.

Pyrite Oxidation Tests

Example 1

Two flat-bottomed flasks were used to determine pyrite oxidation under NitrosaL conditions and chloride conditions. The composition of the sample used for the test-work is presented in Table 4 below which shows that the sample contained 97% pyrite with minor impurities of sulfates and copper sulfides.

TABLE 4

Pyrite sample composition

| Mineral Mass % | Formula | Composition |
|---|---|---|
| Cu Sulfides |  | 0.30 |
| Pyrite | $FeS_2$ | 97.26 |
| Other Sulfides |  | 0.14 |
| Silicates |  | 1.68 |
| Sulfides |  | 0.28 |
| Others | - - - | 0.35 |
| Total |  | 100.00 |

Procedure:

In the experiment, 2×2 L of flat-bottomed flasks were filled with 400 mL of chloride raffinate of a known chemical composition as presented in Tables 6 and 7. Known amounts of nitrate and sulfuric acid were added to the NitrosaL flask and only acid was added to the standard chloride flask as presented in Table 5 below. At time T=0, pyrite was added to the mixture which was cautiously mixed and allowed to settle. A 15 ml volume of the solution was immediately taken from both flasks and analysed for Fe(T), $Fe^{2+}$, $H^+$, $SO_4^{2-}$ and Eh respectively. The solution volume taken out was replaced by an equivalent amount of chloride raffinate. The flask mixture was neither aerated nor agitated during the test period.

TABLE 5

Quantities of reagents used during the test

| Raffinate type | NitrosaL Chloride | Chloride Chloride |
|---|---|---|
| Volume Raffinate (ml) | 400 | 400 |
| Nitrate Sodium Added (g) | 24 | 0 |
| Acid Added (ml) | 38 | 38 |
| Pyrite (g) | 50 | 50 |

TABLE 6

Composition of Chloride Raffinate

| Raffinate | CuT (g/l) | Fe(T) (g/l) | Fe +2 (g/l) | H+ (g/l) | Cl (g/l) | Density | Nitrate (kg/t) | SO4 (g/l) |
|---|---|---|---|---|---|---|---|---|
| Chloride | 0.56 | 1.40 | 0.19 | 8.1 | 151* | 1.26 | 0 | 101 |

The sampling was repeated after 3 hours and then once a day for the next 4 days. The results, tabulated in Tables 7 and 8 below, show a slight decrease in all the measured species for both flask contents once the pyrite was added.

Figure 11:
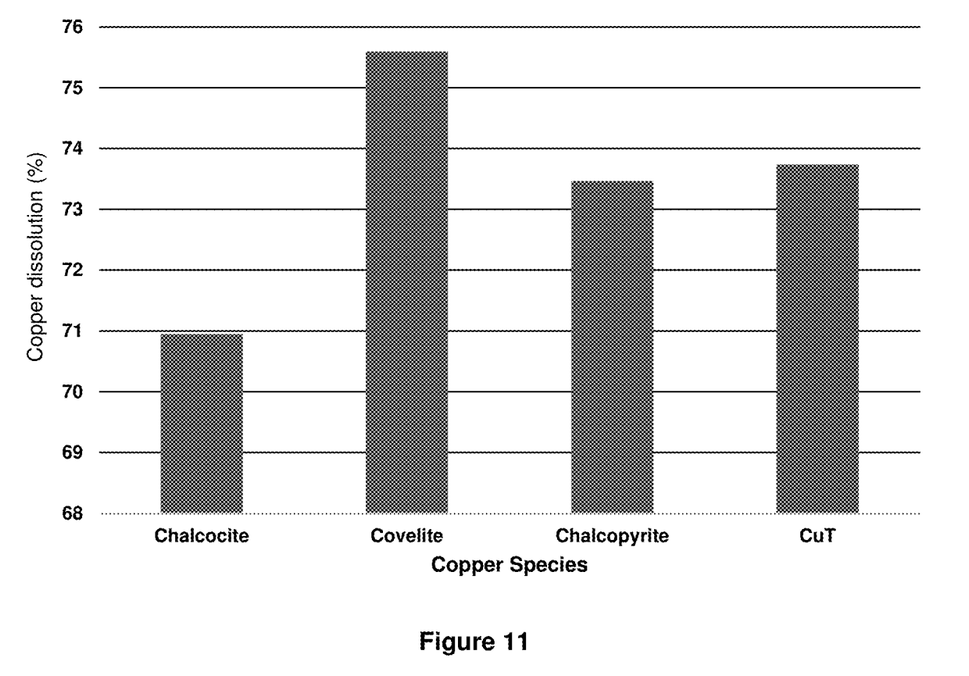
FIG. 11 shows the dissolution of the different copper species under leach conditions of the invention.
Figure 12:
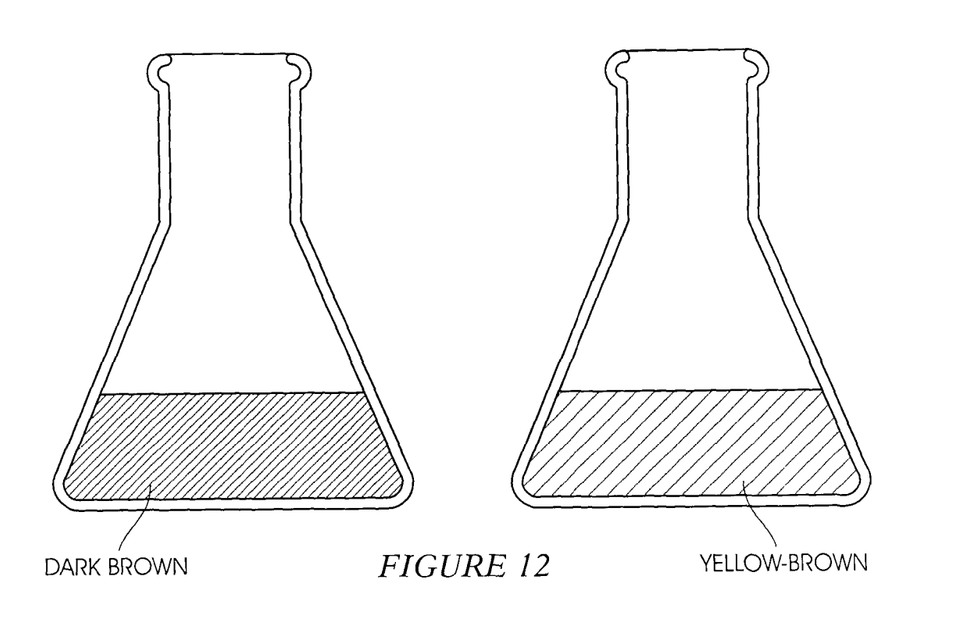
FIG. 12 illustrates a solution colour change after the addition of pyrite with time using the method of the present invention.

However, after a day, there was a sharp increase in both Fe(T) and $SO_4^{2-}$ content in the flask under NitrosaL conditions while in the flask under standard chloride conditions, there was only a slight increase in both Fe(T) and $Fe^{3+}$ respectively. The potential increased from 703 mV to 1023 mV in the NitrosaL flask within the first three hours of the test. After 15 minutes of adding pyrite, the color of the raffinate changed in the NitrosaL flask from dark brown as presented in the flask shown on the left hand side in FIG. 12 to a much clearer yellowish brown solution as shown in the flask on the right hand side in FIG. 11. During the days that followed, the solution potential dropped slightly from 1023 mV and stabilized just below 1000 mV by the end of the test. A steady increase in the concentration of Fe(T) was recorded in the days that followed, which existed mainly as $Fe^{3+}$ indicating that the environment was highly oxidizing even in the absence of forced aeration. The acid concentration remained constant but dropped on the last day from 152 g/L to 115 g/L. The sulfate also increased from 238 g/L to a maximum of 283 g/L before decreasing to 273 g/L on the last day.

Figure 13:
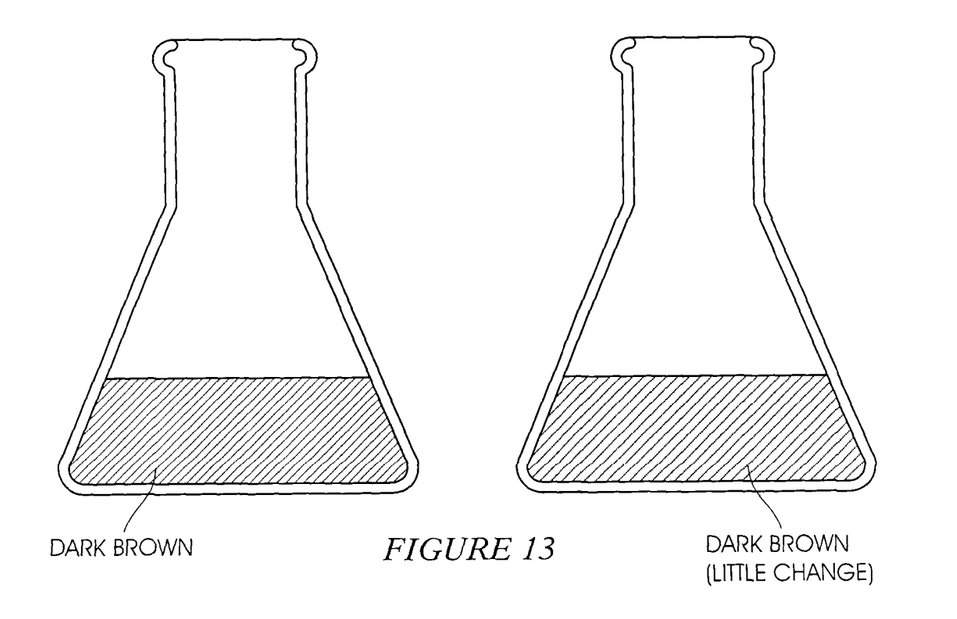
FIG. 13 illustrates a solution colour change after the addition of pyrite with time using a chloride leach process.

In the flask under chloride conditions, shown in FIG. 13, no significant change was observed, and the solution concentration remained almost constant with minor changes in the species (see Table 8).

TABLE 7

Chemical analysis results in NitrosaL flask

| Time (hrs) | Comments | FeT (g/L) | Fe2+ (g/L) | Fe3+ (g/L) | H2SO4 | SO4 (g/L) | Eh (mv) |
|---|---|---|---|---|---|---|---|
| | Initial solution | 1.4 | 0.19 | 1.2 | 8.1 | 101 | 712 |
| | Initial solution + acid | 1.3 | 0.16 | 1.1 | 150 | 261 | 710 |
| | Initial solution + acid + Nitrate | 1.2 | 0.12 | 1.1 | 148 | 239 | 712 |
| | Initial solution + acid + Nitrate, 10 min Later | 1.3 | 0.13 | 1.1 | 146 | 251 | 697 |
| 0.0 | Initial solution + acid + Nitrate + Pyrite | 1.3 | 0.13 | 1.1 | 146 | 251 | 703 |
| 2.85 | | | | | | | 1023 |
| 23.6 | | 7.1 | 0.03 | 7.0 | 146 | 260 | 1001 |
| 50.0 | | 10.8 | 0.03 | 10.7 | 148 | 283 | 995 |
| 70.4 | | 10.3 | 0.06 | 10.3 | 152 | 271 | 997 |
| 98.1 | | 13.1 | 0.04 | 13.0 | 115 | 273 | 1004 |

TABLE 8

Chemical analysis results in chloride flask

| Time (hrs) | Comments | FeT (g/L) | Fe2+ (g/L) | Fe3+ (g/L) | H2SO4 (g/L) | SO4 (g/L) | Eh (mV) |
|---|---|---|---|---|---|---|---|
| | Initial solution | 1.4 | 0.19 | 1.18 | 8.0 | 102 | 712 |
| | Initial solution + acid | 1.3 | 0.16 | 1.18 | 146 | 242 | 710 |
| 0.0 | Initial solution + acid + Pyrite | 1.3 | 0.16 | 1.18 | 146 | 242 | 711 |
| 24.1 | | 1.4 | 0.20 | 1.23 | 144 | 253 | 673 |
| 50.6 | | 1.5 | 0.16 | 1.34 | 147 | 230 | 687 |
| 71.0 | | 1.5 | 0.23 | 1.30 | 149 | 233 | 696 |
| 98.7 | | 1.4 | 0.2 | 1.23 | 148 | 243 | 698 |

The invention significantly improves the initial rate of metal dissolution and reduces the leach period, or leach cycle time, required to achieve the maximum metal recovery for a particular ore. The process of the invention achieves enhanced leach rates, and metal recovery for heap leaching, and constitutes a significant improvement on the established chloride heap leach methods for treatment of base metal ores. The process competes favourably with conventional processing producing a flotation concentrate.

Example 2

2×1 m columns loaded with the sample containing 2.98% pyrite, based on its mineralogy composition as presented in Table 1, were leached under NitrosaL and chloride conditions respectively. After completion of the leach cycle, 100 days for the NitrosaL process and 500 days for the chloride process, the leach residues were submitted for mineralogy analysis. The results, presented in Table 1 below, show that very little pyrite oxidation, if at all, occurred during the 500 days of leaching under chloride conditions while almost half of the pyrite loaded in the column was oxidised in 100 days under NitrosaL conditions. This was evident from the comparatively high iron (mostly ferric) and acid concentrations content in the first PLS obtained from the NitrosaL columns.

Based on the above pyrite oxidation rate, the heat generation rate is 21.6 watts per ton ore and the heap temperature is expected to increase by 10-30° C. above the ambient temperature under NitrosaL conditions as compared to less than 3° C. under hypersaline process. The exact temperature increase of the heap is dependent on the rate of heat loss from the heap, that is, loss by convection and radiation from the heap surface and principally, by moist air leaving the top of the heap and drainage solution leaving from the bottom of the heap. This means that the leach kinetics are expected to more than double under NitrosaL conditions compared to hypersaline conditions and thus reduce the leach cycle time as demonstrated in the copper extraction rate presented above.

TABLE 1

Mineralogy results for the sample used

| Mineral Mass (%) | Formula | Head | Residue NitrosaL | Residue Chloride |
|---|---|---|---|---|
| Chalcocite/Digenite | $Cu_2S$ - $Cu_{1.4}S$ | 0.07 | 0.02 | 0.01 |
| Covellite | $Cu_{1.4}S$ - CuS | 0.06 | 0.01 | 0.02 |
| Chalcopyrite | $CuFeS_2$ | 1.20 | 0.31 | 0.48 |
| Bornite/Idaite | $Cu_5FeS_4$ | 0.01 | 0.00 | 0.00 |
| Other Cu Mins | Cu.x | 0.07 | 0.01 | 0.01 |
| Pyrite | $FeS_2$ | 2.98 | 1.53 | 2.91 |
| Other Sulphides | $PbS/ZnS/MoS_2$ | 0.13 | 0.15 | 0.12 |
| Fe Oxides/Hydroxides | $FeO.OH/Fe_2O_3/Fe_3O_4$ | 0.08 | 0.20 | 0.18 |
| Quartz | $SiO_2$ | 48.90 | 48.77 | 49.17 |
| Feldspars | $(K,Na)AlSi_3O_8/(Ca,Na)Al_2Si_2O_8$ | 6.94 | 9.82 | 8.48 |
| Muscovite/Illite | $KAl_2(Si_3Al)O_{10}(OH,F)_2$ | 35.40 | 34.97 | 33.92 |
| Kaolinite/Clays | $Al_2Si_2O_5(OH)_4/Al_2Si_4O_{10}(OH)_2$ | 2.77 | 2.40 | 2.20 |

TABLE 1-continued

Mineralogy results for the sample used

| Mineral Mass (%) | Formula | Head | Residue NitrosaL | Residue Chloride |
|---|---|---|---|---|
| Biotite/Phlogopite | $K(Mg,Fe^{2+})_3[AlSi_3O_{10}(OH,F)_2$ | 0.32 | 0.13 | 0.20 |
| Chlorite (clinochlore group) | $(Mg, Fe^{2+})_5Al[(OH)_8AlSi_3O_{10}]$ | 0.31 | 0.13 | 0.11 |
| Jarosite/Hydronio jarosite | $(K, Na, H_3O)Fe^{3+}_3(SO_4)_2(OH)_6$ | 0.02 | 0.26 | 0.14 |
| Other Sulphates | $x.SO_4.nH_2O$ | 0.25 | 0.38 | 0.58 |
| Others | - - - | 0.51 | 0.91 | 1.50 |

The invention claimed is:

1. A method of leaching copper from a heap of ore, the method comprising:
   agglomerating ore to form agglomerated ore,
   stacking the agglomerated ore form a heap;
   curing the agglomerated ore in the heap;
   leaching the agglomerated ore in the heap; and
   rinsing the agglomerated ore in the heap;
   wherein, during the agglomerating step, the ore is contacted with an acidified solution, nitrate or nitrite, and chloride, to create an oxidative environment prior to the leaching step, wherein:
   a. the ore is selected from a primary copper ore comprising chalcopyrite or secondary copper sulfide minerals;
   b. wherein during the agglomerating and curing steps, the oxidation potential of the solution in contact with the ore is in the range of greater than 800 mV to less than 1250 mV verses SHE (standard hydrogen electrode), thereby increasing the heap temperature as a result of pyrite and copper sulfide mineral oxidation;
   c. wherein during the leaching step, the heap is irrigated with an irrigation solution which is supplemented with nitrate salts or nitrite salts to maintain the concentration of nitrate or nitrite in the range of up to 20 g/L and wherein the addition of nitrate salts or nitrite salts in the irrigation solution maintains oxidation potentials in the range of greater than 800 mV to less than 1250 mV verses SHE to enhance the rate of copper dissolution.

2. The method of claim 1, wherein:
   a. the chloride is added as a solid, in solution with a raffinate solution or as a separate concentrated salt solution in the range of 1-100 kg/t ore;
   b. the acidified solution comprises sulfuric acid and is added as an acid raffinate solution formed by premixing the sulfuric acid with a raffinate leach solution, as a concentrated acid or a combination of the concentrated acid with the raffinate leach solution thereof in the range of 1-100 kg/t ore;
   c. the nitrate or nitrite is added as a solid salt, in solution by dissolving in a raffinate solution or water, as a separate concentrated nitric acid solution or as a combination thereof in the range of 1-50 kg/t ore; and
   d. wherein the acid raffinate solution is added at a rate determined to achieve an agglomerate moisture content of 3%-20% moisture.

3. The method of claim 2, wherein the acid raffinate solution contains dissolved iron, copper and chloride.

4. The method of claim 3, wherein the chloride is present in the acid raffinate solution at a concentration of 40-160 g/L for primary sulfide ores.

5. The method of claim 2, wherein prior to the agglomerating step, the ore is crushed to a size in the range of P80 of 6 mm to P80 of 50 mm.

6. The method of claim 1, wherein prior to the agglomerating step, the ore is crushed to a size in the range of P80 of 6 mm to P80 of 50 mm.

7. The method of claim 1, further comprising scrubbing and recovering gases produced in the agglomerating step by passing the gases through a process raffinate solution in the presence of air or oxygen enriched air.

8. The method of claim 1, wherein in the curing step, the agglomerated ore is cured for a period of 5-50 days.

9. The method of claim 1, wherein the curing step is carried out without aeration.

10. The method of claim 1, wherein during the curing step, aeration is applied from the bottom of the heap at a rate of up to 0.02 $Nm^3/hr \cdot t$ of ore treated.

11. The method of claim 1, wherein during the leaching step, the heap is irrigated with an irrigation solution which
   a. has a chloride concentration of 10-230 g/L; and
   b. has an acid concentration of 2-20 g/L with a pH less than pH 3.

12. The method of claim 1, wherein the leaching step is carried out without aeration.

13. The method of claim 1, wherein the leaching step is carried out with aeration at a rate of up to 0.02 $Nm^3/hr \cdot t$ of ore treated.

14. The method of claim 1, wherein a resultant pregnant leach solution from the leaching step is treated in a solvent extraction step to recover the leached copper and wherein the solvent extraction step includes at least one copper-loaded organic washing stage to maintain a chloride ion concentration below 50 ppm.

15. The method of claim 1, wherein in the rinsing step, the ore is rinsed with process water to displace and recover acid, chloride, residual copper and residual nitrates or nitrites present in the heap.

16. The method of claim 1, wherein the chloride is selected from one or more of NaCl, KCl, MgCl, $AlCl_3$, and $CaCl_2$).

17. The method of claim 1, wherein the nitrite is selected from one or more of $NaNO_2$, $KNO_2$, and/or $HNO_2$.

18. The method of claim 1, wherein the nitrate is selected from one or more of $NaNO_3$, $KNO_3$, and/or $HNO_3$.

19. The method of claim 1, wherein the acidified solution in contact with the ore during the agglomerating step has a pH of less than 3.

20. The method of claim 1, wherein secondary sulfide materials comprise enargite, bornite, chalcocite, or covellite.

* * * * *